United States Patent Office 3,185,575
Patented May 25, 1965

3,185,575
UNIVERSAL SHORTENING COMPOSITION
Alan S. Geisler, Fairfax, Wilmington, Del., assignor to Atlas Chemical Industries, Inc., Wilmington, Del., a corporation of Delaware
No Drawing. Filed Aug. 8, 1961, Ser. No. 129,994
15 Claims. (Cl. 99—123)

This invention relates to a multi-purpose shortening composition comprising a fat base and an emulsifier or emulsifier blend. In particular, this invention relates to using isosorbide esters and their polyoxyethylene derivatives as emulsifiers for universal shortenings.

Present household, so-called "All-Purpose," shortenings customarily comprise hydrogenated vegetable oils, or blends of hydrogenated vegetable oils and meat fats, emulsified with monoglyceride mixtures which contain diglycerides. Usually the total emulsifier content is sufficient to furnish up to about 5% monoglyceride, based on the weight of the shortening. Refined vegetable oils may also be sold as "All-Purpose" shortenings.

The presently available household shortenings actually represent a compromise in their properties, designed to yield acceptable, but not superior, results for whatever purpose they are used, or they may provide good results for one application and poor results for others. For example, a typical commercial shortening made of hydrogenated vegetable oil with added monoglyceride will give fair results in cakes and icings, but when used for frying, tends to smoke at 350–360° F. which is barely acceptable. The monoglyceride mixture, which contributes to the emulsification of cakes and icings, causes the lowered smoke point. A minimum smoke point of 375° F. is preferred for good results. Refined vegetable oils are deficient as "All-Purpose" shortenings, for though they are excellent for frying, having smoke points in the range of 380–420° F., they yield poor results in cakes and icings.

Attempts have been made to improve the frying properties of emulsified shortenings by using highly refined monoglycerides as emulsifiers, but apparently an equilibrium condition is established which causes a small percentage of even the most highly refined monoglyceride to break down into fatty acids and glycerol under the application of heat, as in frying. It seems that the vaporization of fatty acids and glycerol causes smoking when these shortenings are heated above about 350° F., and that as the glycerol and fatty acids vaporize, the monoglyceride continues to break down to maintain equilibrium which ensures a continuously depressed smoke point.

Sorbitan ester and polyoxyethylene sorbitan ester type emulsifiers may be used to prepare shortenings, for they have excellent emulsifying properties in cakes and icings. Shortenings containing sorbitan monostearate and polyoxyethylene (20) sorbitan monostearate emulsifier blends have been prepared, and found to produce superior cakes and had relatively good smoke points. However, when subjected to the continuous application of heat, as in frying, these shortenings also have tended to polymerize and darken.

It is an object of this invention to provide a shortening composition capable of producing good to excellent cakes and icings, and having good frying properties.

It is another object of this invention to provide clear liquid shortening compositions which are capable of producing fair to good cakes and icings and have good frying properties.

Other objects and advantages will be apparent from the following description of the invention.

It has been discovered that a shortening composition capable of producing fair to excellent cakes and icings and having good frying properties, known in the art as universal shortenings, can be prepared by forming a shortening comprising a fat base selected from the group consisting of meat fats, hydrogenated vegetable oils liquid vegetable oils, liquid animal oils, and mixtures of these fat bases and an emulsifier composition of the isosorbide type. The novel emulsifier compositions of this invention which form superior universal shortenings when added to fat bases are polyoxyethylene derivatives of isosorbide fatty acid esters used as the sole emulsifier, and blends of polyoxyethylene derivatives of isosorbide fatty acid esters blended with isosorbide fatty acid esters.

It has been determined that a specific range of emulsifier HLB (hydrophile-lipophile balance) is necessary for the emulsifiers of this invention to provide good universal shortenings. [For a detailed discussion of the HLB system see "Classification of Surface-Active Agents by HLB," by William C. Griffin, published in the Journal of the Society of Cosmetic Chemists, vol. I, No. 5, pp. 311–326, December 1949.] This specific range of emulsifier HLB can be obtained by balancing the fatty acid group (lipophilic) against the ethylene oxide content (hydrophilic). A range of emulsifier HLB values giving acceptable results in universal shortenings is about 8 to about 18, with 10 to 13 being the preferred range. Emulsifiers having HLB values within the 8 to 18 range yield universal shortenings, made in accordance with this invention, which are capable of producing superior cakes and which have good frying properties. Emulsifiers having HLB values below about 8 tend to cause the shortening to have a lower smoke point which is undesirable when the shortening is to be used for frying. If the shortening emulsifier has an HLB above about 18, it tends to be insoluble in the fat base which is particularly troublesome when a liquid fat base is used. In addition, shortenings containing emulsifiers having a combined HLB above about 18 tend to produce poorer cakes.

The emulsifiers useful in this invention may constitute polyoxyethylene derivatives of isosorbide fatty acid esters or blends of polyoxyethylene derivatives of isosorbide fatty acid esters blended with isosorbide fatty acid esters. The isosorbide may be esterified by reacting with fatty acids having from about 12 to 22 carbon atoms, such as stearic, palmitic, oleic, lauric, and behenic and arachidic acids. Both mono- and diesters are operative in this invention, and the term esters is meant to include monoesters and diesters and mixtures of mono- and diesters.

The ethylene oxide content of the isosorbide fatty acid ester derivatives may range from 4 moles to 50 moles of ethylene oxide per mole of isosorbide ester. The polyoxyethylene derivatives of the isosorbide esters can be used as the sole emulsifier when the ethylene oxide content is low, such as 10 to 15 moles of ethylene oxide per mole of isosorbide ester, for this may yield an emulsifier having an HLB falling within the acceptable HLB range of 8—18 for universal shortenings made in accordance with this invention. When the ethylene oxide content is greater than 15 moles per mole of isosorbide monoester, such as 20 moles of ethylene oxide per mole of isosorbide monoester, or greater than 30 moles per mole of isosorbide diester, such as 40 moles of ethylene oxide per mole of isosorbide diester, the resultant HLB may be too high for optimum performance. Therefore, an isosorbide fatty acid ester may be blended with the polyoxyethylene derivative of an isosorbide fatty acid ester to decrease the HLB to an acceptable value, for the isosorbide ester is a lipophilic agent, i.e. increases the oil solubility of the emulsifier. In some cases, in order to reduce the HLB to within the acceptable range, it may be necessary to add as much as 60% by weight of the isosorbide fatty acid ester to the polyoxyethylene isosorbide fatty acid ester. Since it is the fatty acid acyl group which contributes the lipophile property, lesser amounts may be used if an isosorbide fatty acid diester is used to reduce the HLB of the emulsifier.

As previously stated, the mole ratios of ethylene oxide to isosorbide ester may vary from 4/1 to 50/1, as designated polyoxyethylene (4–50) isosorbide ester, with mole ratios from 10/1 to 30/1 the preferred range. The particular mole ratio of ethylene oxide to isosorbide ester is determined by the amount of ethylene oxide necessary to maintain the HLB of the total emulsifier within the acceptable range. If mole ratios less than 10/1 ethylene oxide per isosorbide ester are used, the polyoxyethylene isosorbide monoester will have to be used in order to maintain the HLB within the acceptable range, and shortenings utilizing polyoxyethylene isosorbide monoesters as emulsifiers yield cake batters which while generally good are somewhat grainier than those made with shortenings utilizing polyoxyethylene isosorbide diesters in accordance with this invention. It has been determined that the isosorbide ester has a greater effect on smoke point than the polyoxyethylene isosorbide esters, and therefore, if the ethylene oxide content is greater than 50/1, more isosorbide ester may be required to maintain the HLB within the acceptable range, which may adversely affect the smoke point. In addition, if the ethylene oxide content is greater than 50/1, the polyoxethylene isosorbide ester is difficult to solubilize or disperse in the fat base.

As previously stated, the fat base used in preparing universal shortening compositions in accordance with this invention may comprise a meat fat, hydrogenated vegeable oils, liquid vegetable oils, liquid animal oils and mixtures of these. Meat fats and hydrogenated vegetable oils may be used to prepare normally plastic shortening compositions. It has been found that if a polyoxyethylene isosorbide ester or a blend of polyoxyethylene isosorbide ester blended with an isosorbide ester is incorporated as an emulsifier in such a plastic shortening, a normally plastic, universal shortening composition for household use, which is capable of producing good to excellent cakes and icings and has good frying properties, is formed. The normally plastic, universal shortenings of this invention are capable of producing better cakes and icings than currently available commercial shortenings, and they have much improved frying properties as indicated by a smoke point of more than 380° F. and no tendency to darken.

A liquid, universal shortening can also be prepared in accordance with this invention by using liquid oil as the fat base. It has been discovered that a clear liquid, universal shortening can be prepared by using a polyoxyethylene isosorbide ester or a blend of a polyoxyethylene isosorbide ester blended with an isosorbide ester as the emulsifier in a liquid fat base. The liquid, universal shortenings of this invention are generally stable against separation and may be clear, though the cloudy liquid shortenings generally produce better cakes than the clear shortenings. One of the principal problems with liquid shortenings is their inability to produce good cakes, whereas the liquid universal shortenings of this invention produce moderately good cakes though not as good as the normally plastic universal shortening. In addition, the liquid, universal shortenings have high smoke points and so are good for fryings, and since they are liquid oils, they may be used as dressings.

As stated above, the liquid universal shortenings may be clear or cloudy, depending upon the solubility of the emulsifier in the liquid fat base. It has been found that emulsifiers having high melting points, such as palmitates and stearates, have lower solubilities in liquid oils, and therefore, if more emulsifier than is soluble is present in the liquid oil, emulsifier crystals tend to form which gives the liquid shortening a cloudy appearance.

It is within the scope of this invention for the universal shortening compositions to contain conventional emulsifiers and ingredients in addition to the polyoxyethylene isosorbide esters or the polyoxyethylene isosorbide ester/isosorbide ester blend. In particular, in order to improve the stability and the cake baking properties of the liquid, universal shortenings, it may be desirable to add an additional emulsifier, such as a polyoxyethylene sorbitan ester, though this does lower the smoke point of the liquid shortening.

Preferably, the emulsifier should be added in amounts ranging from about 0.5–8 percent based on the total universal shortening weight. If less emulsifier is used, it has little or no effect as an emulsifying agent, and if more than 8 percent is added, it is impractical and may have a deleterious effect on the smoke point.

The particular function of the isosorbide ester derivatives, and the isosorbide esters when present, as shortening emulsifiers is that they provide, preferably in amounts of 0.5–8 percent based on shortening weight, equal or improved properties in cakes and icings as compared to the monoglyceride mixtures or other emulsifiers now used, while they do not cause the marked smoke point depression associated with the emulsifiers now used.

The polyoxyethylene derivatives of isosorbide mono- and diesters of this invention may be prepared by reacting the isosorbide with ethylene oxide before esterification, known in the art as dendrizing, or by preparing a partial isosorbide ester first and then reacting that isosorbide partial ester with ethylene oxide, known in the art as catenylating.

A normally plastic universal shortening according to this invention may be prepared by melting together the fat base and the isosorbide type emulsifiers, rapidly cooling the composition, and thoroughly mixing and aerating the contents by "Votation." The "Votating" process is fully described by A. E. Bailey in Industrial Oil and Fat Products, 2nd edition, 1951, Interscience Publishers, Inc., New York, pages 920–924. The resultant product is a white, creamy, normally plastic shortening. The liquid universal shortenings may be prepared by melting the emulsifiers in the liquid fat base. If the emulsifiers are liquid, they may be readily added to the liquid fat base.

The composition and performance of typical universal shortening compositions in accordance with the invention is demonstrated in the following examples. In these examples, all of the polyoxyethylene isosorbide esters were prepared by dendrizing, and all of the HLB values were calculated and are merely approximate.

EXAMPLE I

Typical shortening emulsifier compositions which may be used to prepare universal shortening compositions in accordance with this invention are represented by the following isosorbide type emulsifiers and emulsifier blends:

| Parts | Emulsifier | HLB |
|---|---|---|
| | A | |
| 1 | Isosorbide monostearate | 11 |
| 9 | Polyoxyethylene (15) isosorbide distearate | |
| | B | |
| 3 | Isosorbide monostearate | 10 |
| 2 | Polyoxyethylene (20) isosorbide monostearate | |
| | C | |
| 1 | Isosorbide dioleate | 15 |
| 9 | Polyoxyethylene (20) isosorbide monostearate | |
| | D | |
| 1 | Isosorbide monopalmitate | 11 |
| 9 | Polyoxyethylene (15) isosorbide distearate | |
| | E | |
| | Polyoxyethylene (10) isosorbide distearate | 9 |
| | F | |
| 1 | Isosorbide distearate | 11 |
| 19 | Polyoxyethylene (15) isosorbide distearate | |
| | G | |
| 3 | Isosorbide dioleate | 11 |
| 17 | Polyoxyethylene (15) isosorbide distearate | |
| | H | |
| 2 | Isosorbide dioleate | 11 |
| 7 | Polyoxyethylene (20) isosorbide dioleate | |

EXAMPLE II

Typical universal shortening compositions made in accordance with this invention are represented by the following compositions:

(A)

| | Gm. |
|---|---|
| Hydrogenated vegetable oil | 582.0 |
| Polyoxyethylene (10) isosorbide distearate, HLB 9 | 18.0 |

(B)

| | |
|---|---|
| Hydrogenated vegetable oil | 582.0 |
| Isosorbide monostearate, HLB 11 | 1.8 |
| Polyoxyethylene (15) isosorbide distearate, HLB 11 | 16.2 |

(C)

| | |
|---|---|
| Lard | 570.0 |
| Isosorbide monostearate, HLB 12 | 18.0 |
| Polyoxyethylene (20) isosorbide monostearate, HLB 12 | 12.0 |

(D)

| | |
|---|---|
| Lard | 582.0 |
| Isosorbide monostearate, HLB 11 | 1.8 |
| Polyoxyethylene (15) isosorbide distearate, HLB 11 | 16.2 |

(E)

| | |
|---|---|
| Lard | 291.0 |
| Hydrogenated vegetable oil | 291.0 |
| Isosorbide distearate, HLB 11 | 1.8 |
| Polyoxyethylene (15) isosorbide distearate, HLB 11 | 16.2 |

(F)

| | |
|---|---|
| Cottonseed oil | 96.0 |
| Isosorbide monostearate, HLB 12 | 2.0 |
| Polyoxyethylene (50) isosorbide monooleate, HLB 12 | 2.0 |

(G)

| | |
|---|---|
| Cottonseed oil | 95.5 |
| Isosorbide monostearate, HLB 11 | 0.9 |
| Polyoxyethylene (15) isosorbide distearate, HLB 11 | 3.6 |

(H)

| | |
|---|---|
| Cottonseed oil | 96.0 |
| Polyoxyethylene (10) isosorbide distearate, HLB 9 | 4.0 |

EXAMPLE III

Universal shotenings made by the "Votating" process and in accordance with this invention can be prepared using the following formulae:

(1)

| | Gms. |
|---|---|
| Hydrogenated vegetable oil | 582.0 |
| Isosorbide monostearate, HLB 15 | 1.8 |
| Polyoxyethylene (20) isosorbide monostearate, HLB 15 | 16.2 |
| | 600.0 |

(2)

| | |
|---|---|
| Hydrogenated vegetable oil | 582.0 |
| Isosorbide dioleate, HLB 15 | 1.8 |
| Polyoxyethylene (20) isosorbide monostearate, HLB 15 | 16.2 |
| | 600.0 |

(3)

| | |
|---|---|
| Hydrogenated vegetable oil | 570.0 |
| Isosorbide dioleate, HLB 8 | 18.0 |
| Polyoxyethylene (20) isosorbide monostearate, HLB 8 | 12.0 |
| | 600.0 |

(4)

| | |
|---|---|
| Hydrogenated vegetable oil | 570.0 |
| Isosorbide monostearate, HLB 11 | 18.0 |
| Polyoxyethylene (20) isosorbide monostearate, HLB 11 | 12.0 |
| | 600.0 |

EXAMPLE IV

The shortenings of Example III were compared in cakes and icings with a commercial "All-Purpose" shortening made from hydrogenated vegetable oil blended with a monoglyceride emulsifier having a total monoglyceride equivalent content of about 5%. As a test of frying quality, smoke point determinations were also made for the shortenings.

The four shortenings of Example III and the commercial shortening were used to prepare white cakes having the following ingredients:

(A)

| | | |
|---|---|---|
| Cake flour (Snosheen) | gm | 210 |
| Sugar | gm | 260 |
| Salt | gm | 5 |
| Baking powder (Calument) | gm | 12 |

(B)

| | | |
|---|---|---|
| Shortening | gm | 100 |
| Fresh milk | cc | 163 |

(C)

| | | |
|---|---|---|
| Fresh milk | cc | 79 |
| Egg whites | cc | 120 |

Directions for preparation:
(1) Place (A) into Hamilton Beach mixing bowl and dry mix for minute at speed No. 6.
(2) Add (B), mix for 5 minutes at speed No. 6, scrape down sides of bowl.
(3) Add (C), mix for 2 minutes at speed No. 6.
(4) Scale 420 grams each into two 8" pans.
(5) Bake at 350° F. for 27 minutes.

Results: The values of total cake volume are averages of two tests.

| Shortening | Batter, Sp. G. | Total cake vol. (cc.) | Texture |
|---|---|---|---|
| (1) | .82 | 1,995 | Sl. tender. |
| (2) | .82 | 1,970 | Do. |
| (3) | .84 | 1,940 | Do. |
| (4) | .81 | 2,050 | Mod. tender. |
| Commercial shortening | .88 | 1,900 | V. sl. tender. |

Icings were prepared using the following icing formula:

| | Gm. |
|---|---|
| Powdered sugar, 10X (sifted) | 681.0 |
| Shortening | 170.3 |
| Distilled water | 128.0 |
| | 979.3 |

Procedure:
(1) Weigh sugar and shortening and place in 5 qt. bowl of Hobart mixer.
(2) Add 64 cc. of water, and mix at speed No. 1 for 1 minute.
(3) Add remaining 64 cc. of water over next 4 minutes while mixing at speed No. 2, scrape down sides.
(4) Continue to mix at speed No. 2, measuring weight of icing in standard cup at 10, 15, 20 and 24 minutes.
Results:

| Shortening | Weight in grams | | | | Vol. (24 min.) (cc./100 g.) | Appearance |
|---|---|---|---|---|---|---|
| | 10 min. | 15 min. | 20 min. | 24 min. | | |
| (1) | 147 | 144 | 143 | 143 | 149.6 | Smooth and sl. fluffy. |
| (2) | 150 | 147 | 145 | 144 | 148.1 | Smooth and fluffy. |
| (3) | 145 | 142 | 141 | 141 | 152.5 | Do. |
| (4) | 149 | 147 | 147 | 146 | 145.2 | Smooth and sl. fluffy. |
| Commercial shortening. | 161 | 155 | 153 | 152 | 137.5 | Sl. wet. |

Smoke point determinations were also made with the following results:

| Shortening | Smoke point (° F.) | Appearance |
|---|---|---|
| (1) | 385 | Clear, very light color. |
| (2) | 390 | Do. |
| (3) | 360 | Do. |
| (4) | 395 | Clear, very slightly darkened. |
| Commercial shortening | 348 | Clear, very light color. |

The foregoing results indicate that shortenings (1) and (2) are good universal shortenings, yielding 4–5% greater cake volume and 8–9% greater icing volume than the commercial shortening. The commercial shortening's smoke point is found to be below 375° F., the minimum level for good frying qualities, while those of shortenings (1) and (2) are greater than 375° F., showing a marked improvement over the commercial shortening.

Shortenings (3) and (4) illustrate shortenings which are designed to place emphasis on results in particular applications. Shortening (3) demonstrated excellent properties in icings but its smoke point is not quite satisfactory. Shortening (4) demonstrated better properties in cakes, and though it had an excellent smoke point, it tended to darken very slightly when exposed to high temperatures.

Shortening (1), of the shortenings disclosed in Example III, seemed to be the best universal shortening as indicated by the tests in Example IV, but this shortening also seemed to have certain undesirable characteristics as compared with some of the other shortenings of this invention. Two of the problems were the fact that it produced somewhat grainy cake batters, not unlike commercial shortenings presently used, and probably due to the relatively high HLB (hydrophile-lipophile balance) of the polyoxyethylene (20) isosorbide monostearate, a small quantity of emulsifier tended to separate out on melting.

EXAMPLE V

The following additional shortenings were prepared by the "Votating" process using polyoxyethylene (15) isosorbide distearate, a more oil-soluble emulsifier:

(A)

| | Percent by wt. |
|---|---|
| Isosorbide monostearate, HLB 11 | 0.3 |
| Polyoxyethylene (15) isosorbide distearate, HLB 11 | 2.7 |
| Hydrogenated vegetable oil | 97.0 |
| | 100.0 |

(B)

| | |
|---|---|
| Isosorbide distearate, HLB 11 | 0.3 |
| Polyoxyethylene (15) isosorbide distearate, HLB 11 | 2.7 |
| Hydrogenated vegetable oil | 97.0 |
| | 100.0 |

(C)

| | |
|---|---|
| Isosorbide monopalmitate, HLB 11 | 0.3 |
| Polyoxyethylene (15) isosorbide distearate, HLB 11 | 2.7 |
| Hydrogenated vegetable oil | 97.0 |
| | 100.0 |

EXAMPLE VI

The three shortenings of Example V were then compared to commercial shortening, having a total monoglyceride equivalent content of about 5%, in the same manner as the shortenings of Example III were compared to commercial shortening in Example IV.

Results for preparing white cakes:

| Shortening | Batter | Sp. Gr. | Texture | Volume in cc. | | |
|---|---|---|---|---|---|---|
| | | | | A | B | Total A and B |
| A | Smooth and creamy. | 0.82 | Mod. tender. | 1,090 | 1,085 | 2,175 |
| B | do | 0.79 | do | 1,090 | 1,090 | 2,180 |
| C | do | 0.81 | do | 1,100 | 1,085 | 2,185 |
| Commercial shortening. | Slightly grainy and slightly creamy. | 0.87 | Slightly tender. | 1,000 | 1,015 | 2,015 |

As evident from the results, the batters of the three new shortenings were smooth rather than grainy, and the cake volumes showed an even greater increase over the commercial shortening than had previously been obtained. By using a polyoxyethylene isosorbide diester instead of the monoester as in Example IV, the problem of a grainy white cake batter was avoided.

Results for preparing standard icings:

| Shortening | Weight in grams | | | | Volume (cc./100 g.) | Appearance |
|---|---|---|---|---|---|---|
| | 10 min. | 15 min. | 20 min. | 24 min. | | |
| A | 151 | 149 | 147 | 147 | 143.7 | Light and fluffy. |
| B | 148 | 145 | 141 | 142 | 151.0 | Do. |
| C | 151 | 147 | 143 | 144 | 148.1 | Do. |
| Commercial shortening. | 162 | 158 | 156 | 153 | 136.2 | Slightly wet and fluffy. |

As evident from the results, all three show significant improvement in icing performance as compared to the commercial shortening both in volume and texture.

Results of smoke point determination:

| Shortening | Smoke point (° F.) | Appearance |
|---|---|---|
| A | 375 | Light and clear |
| B | 370 | Do. |
| C | 370 | Do. |
| Commercial shortening | 360 | Do. |

It should be noted that a different sample of commercial shortening was used in this test and this sample had a smoke point of 360° F. as opposed to 348° F. for the sample tested in Example IV.

The three new All-Purpose shortenings did not demonstrate the great improvement in smoke point as the shortenings of Example III, but the smoke points of 370° and 375° F. for the new shortenings are a real improvement.

EXAMPLE VII

Universal shortening compositions were prepared by the "Votating" process using an isosorbide ester only and a polyoxyethylenated isosorbide ester only, which compositions were compared for effectiveness in cakes, icings, and smoke point depression with a universal shortening composition previously found to give very good results.

The following universal shortenings were prepared:

(1)

| | |
|---|---:|
| Hydrogenated vegetable oil | 582.0 |
| Isosorbide monostearate, HLB 6 | 18.0 |
| | 600.0 |

(2)

| | |
|---|---:|
| Hydrogenated vegetable oil | 582.0 |
| Polyoxyethylene (10) isosorbide distearate, HLB 9 | 18.0 |
| | 600.0 |

(3)

| | |
|---|---:|
| Hydrogenated vegetable oil | 582.0 |
| Isosorbide monostearate, HLB 11 | 1.8 |
| Polyoxyethylene (15) isosorbide distearate, HLB 11 | 16.2 |
| | 600.0 |

EXAMPLE VIII

The shortenings of Example VII were then compared to a commercial shortening having a total monoglyceride equivalent content of about 5%, in white cakes and icings having the same recipe and using the same procedures as in Example IV. Smoke points were also determined.

Results:

| Shortening | Batter Sp. G. | Batter Viscosity | Cake, vol. (cc.) | Icing, vol. (cc.) | Smoke point (F.) |
|---|---|---|---|---|---|
| 1 | .90 | Sl. thin | 1,630 | 133.0 | 370 |
| 2 | 0.82 | Creamy | 1,900 | 148.0 | 380 |
| 3 | .83 | do | 1,850 | 145.2 | 395 |
| Commercial shortening | 1.01 | Thin | 1,665 | 133.4 | 350 |

These results indicate that these emulsifiers, each having HLB's within a specific range, preferably 10–13, provide universal shortenings which can be used to make good cakes and icings and which have an acceptable smoke point when used for frying. As shown by the data, the use of the isosorbide fatty acid ester alone resulted in an HLB which provided little improvement in cakes and icings as compared to the commercial shortening utilizing ordinary mono- and diglycerides emulsifiers, and also resuled in inferior performance as compared to the universal shortenings having HLB values within the acceptable range.

The results also indicate that the HLB range can be altered by balancing the fatty acid group of the emulsifier against the ethylene oxide content in such a manner that an acceptable HLB can be obtained.

EXAMPLE IX

Liquid universal shortening compositions were prepared by melting an emulsifier or an emulsifier blend in cottonseed oil, which was used as the liquid fat base, at about 160° F. After all of the emulsifier had been melted into the oil, the composition was cooled to 40° F. for 3 hours and then tempered at 85° F. for 12 hours. The stability of some of the liquid shortening compositions at room conditions was observed over an extended period. The liquid shortenings were used to bake cakes the second day after their preparation. Smoke point evaluations were also made on some of the shortening compositions.

The following liquid shortening compositions were tested:

| | HLB | Weight percent |
|---|---|---|
| 1 | | |
| Cottonseed oil | | 96 |
| Polyoxyethylene (20) isosorbide monstearate | 16 | 4 |
| 2 | | |
| Cottonseed oil | | 95.5 |
| Isosorbide monostearate | 12 | 0.45 |
| Polyoxyethylene (15) isosorbide distearate | | 4.05 |
| 3 | | |
| Cottonseed oil | | 96 |
| Isosorbide monostearate | 12 | 2 |
| Polyoxyethylene (50) isosorbide monooleate | | 2 |
| 4 | | |
| Cottonseed oil | | 96 |
| Polyoxyethylene (10) isosorbide distearate | 9 | 4 |
| 5 | | |
| Cottonseed oil | | 94 |
| Polyoxyethylene (10) isosorbide distearate | 10 | 5 |
| Polyoxyethylene (20) sorbitan monostearate | | 1 |
| 6 | | |
| Cottonseed oil | | 291 |
| Polyoxyethylene (15) isosorbide distearate | 12 | 9 |
| 7 | | |
| Cottonseed oil | | 97 |
| Isosorbide distearate | 9 | 0.9 |
| Polyoxyethylene (15) isosorbide distearate | | 2.1 |
| 8 | | |
| Cottonseed oil | | 97.6 |
| Isosorbide diolaete | 9 | 0.7 |
| Polyoxyethylene (15) isosorbide distearate | | 1.7 |

The results of the liquid shortening stability tests and the smoke point evaluations were as follows:

| Shortening | Smoke point (°F.) | Stability |
|---|---|---|
| 1 | 400 | |
| 2 | 405 | Clear after 8 weeks. |
| 4 | 430 | Do. |
| 5 | 395 | Do. |
| 6 | 395 | Do. |

The liquid universal shortenings were also used to prepare a conventional household white cake. The cake volume and the specific gravity of the batter were measured.

| Shortening | Batter, Sp. G. | Cake volume (cc.) |
|---|---|---|
| 1 | 1.12 | 1,900 |
| 2 | 1.01 | 1,920 |
| 3 | 1.14 | 1,925 |
| 4 | 1.05 | 1,860 |
| 5 | 1.01 | 1,930 |
| 6 | 1.08 | 1,745 |
| 7 | 1.11 | 1,830 |
| 8* | | |

*Shortening #8 was used in a different white cake recipe and gave a cake volume equivalent to a control cake prepared with a plastic shortening.

These results indicate that the liquid universal shortening produced a cake having good volume, though generally not as good as the plastic universal shortening of this invention. The performance of the liquid universal shortening is particularly outstanding in view of the fact that when cottonseed oil containing no emulsifier was used as a shortening to bake a white cake, the cake volume was only 1450 cc.

As used in the claims which follow, the term "consisting essentially of" includes compositions containing the named ingredients and any other ingredients which do not deleteriously affect the compositions for the purposes stated in the specification.

This application is a continuation-in-part of my copending application, Serial No. 49,455, filed August 15, 1960, which is now abandoned.

Having completely described this invention, what is claimed is:

1. A universal shortening composition suitable for both baking and frying consisting essentially of a fat base and from about 0.5% to about 8.0% of an emulsifier consisting essentially of a polyoxyethylene isosorbide fatty acid ester which has an HLB value in the range of about 8 to about 18.

2. The composition of claim 1 in which the polyoxyethylene isosorbide fatty acid ester is selected from the group consisting of stearates, oleates, palmitates, laurates, behenates and arachidates.

3. The composition of claim 2 in which the fat base is a liquid vegetable oil.

4. A universal shortening composition suitable for both baking and frying consisting essentially of a fat base and from about 0.5% to about 8.0% of an emulsifier consisting essentially of a polyoxyethylene isosorbide distearate having an HLB value in the range of from 10 to 13.

5. The composition of claim 4 in which the fat base is a liquid vegetable oil.

6. A universal shortening composition suitable for both baking and frying consisting essentially of a fat base and from about 0.5% to about 8.0% of an emulsifier blend consisting essentially of a polyoxyethylene isosorbide fatty acid ester blended with an isosorbide fatty acid ester, which emulsifier blend has an HLB value in the range of about 8 to about 18.

7. The composition of claim 6 in which the polyoxyethylene isosorbide fatty acid ester and isosorbide fatty acid ester are selected from the group consisting of stearates, oleates, palmitates, laurates, behenates and arachidates.

8. The composition of claim 7 in which the fat base is a liquid vegetable oil.

9. A universal shortening composition suitable for both baking and frying consisting essentially of a fat base and from about 0.5% to about 8.0% of an emulsifier blend consisting essentially of a polyoxyethylene isosorbide stearate ester blended with an isosorbide stearate ester, which emulsifier blend has an HLB value in the range of about 8 to about 18.

10. The composition of claim 9 in which the emulsifier blend has an HLB value ranging from about 10 to 13.

11. The composition of claim 9 in which the fat base is a liquid vegetable oil.

12. A universal shortening composition suitable for both baking and frying consisting essentially of a fat base and from about 0.5% to about 8.0% of an emulsifier blend consisting essentially of a polyoxyethylene isosorbide distearate blended with isosorbide distearate, which emulsifier blend has an HLB value in the range of about 8 to about 18.

13. The composition of claim 12 in which the fat base is a liquid vegetable oil and the emulsifier blend has an HLB value ranging from about 10 to 13.

14. A universal shortening composition suitable for both baking and frying consisting essentially of a fat base and from about 0.5% to about 8.0% of an emulsifier blend consisting essentially of a polyoxyethylene isosorbide distearate blended with isosorbide monostearate, which emulsifier blend has an HLB value in the range of about 8 to about 18.

15. The composition of claim 14 in which the fat base is a liquid vegetable oil and the emulsifier blend has an HLB value ranging from about 10 to 13.

References Cited by the Examiner

UNITED STATES PATENTS

| 2,132,398 | 10/38 | Coith et al. | 99—123 |
| 2,422,486 | 6/41 | Johnston | 99—123 X |
| 2,380,166 | 7/45 | Griffin | 252—312 X |
| 2,671,027 | 3/54 | Cross | 99—118 X |
| 2,746,868 | 5/56 | Cross et al. | 99—123 |
| 2,864,705 | 12/58 | Schulman | 99—118 |
| 2,968,562 | 1/61 | Houser | 99—118 |

FOREIGN PATENTS 806,723 12/58 Great Britain.

OTHER REFERENCES

"Atlas Spans and Atlas Tweens," Atlas Powder Co., Wilmington, Delaware, reprinted June 1945.

A. LOUIS MONACELL, *Primary Examiner.*

TOBIAS E. LEVOW, *Examiner.*